United States Patent [19]

Mendelsohn et al.

[11] Patent Number: 6,079,850
[45] Date of Patent: Jun. 27, 2000

[54] MOUNTING DEVICE FOR A LAMP FOR A BIRDCAGE

[76] Inventors: Fred M. Mendelsohn, 1214 W. Cass St., Tampa, Fla. 33606; Simon A. H. Lee, 316 Chungli City, Taoyuan Hsien, Taiwan

[21] Appl. No.: 09/236,542

[22] Filed: Jan. 25, 1999

[51] Int. Cl.[7] ................................................ F21V 33/00
[52] U.S. Cl. ................ 362/253; 362/220; 362/396; 362/198; 362/427; 362/418; 119/467; 119/459
[58] Field of Search .................................... 362/220, 396, 362/198, 199, 427, 253, 418; 119/467, 459, 713

[56] References Cited

U.S. PATENT DOCUMENTS

| | | | |
|---|---|---|---|
| 1,622,057 | 3/1927 | Senter | 248/214 |
| 2,740,039 | 3/1956 | Philips | 362/413 |
| 3,790,770 | 2/1974 | Stern | 362/98 |
| 5,012,394 | 4/1991 | Woodward | 362/198 |

Primary Examiner—Sandra O'Shea
Assistant Examiner—Ali Alavi
Attorney, Agent, or Firm—A. W. Fisher, III

[57] ABSTRACT

A mounting device for a lamp on a birdcage comprised of a lamp receptacle provided on both ends thereof at least with a telescopically movable rod having a lock. Wherein, the locks can be hung and fixed on any positions on the frame of the birdcage; and by providing a plurality of telescopically movable rods, a lamp for the birdcage can be provided at a location on the frame of the birdcage requiring a light source. This can allow adjustment of distances and orientations of the light rays projected from the lamp to birds, thus growth of the birds can be promoted.

8 Claims, 6 Drawing Sheets

MOUNTING DEVICE FOR A LAMP FOR A BIRDCAGE

BACKGROUND OF THE INVENTION

1. Field of the Invention

The present invention is related to a mounting device for a lamp on a birdcage. The device can be movably mounted on the birdcage made with various net-like frames (or grates). The distances, angles and the locations of light rays can all be changeable and adjustable by means of the device in favor of utilizing of the device by experts in breeding birds to give the birds in the birdcage best incident rays for growth.

2. Description of the Prior Art

Bird breeding has been being a leisure activity for bird loving people since long, long time ago. Various birdcages are available in the markets. These birdcages are mostly network cages for breeding birds therein. Bird breeding is a kind of knowledge. Sometimes bird breeders cover their birdcages with black cloths to obscure light and the birds in the cages can get more rest time at night. Sometimes the breeders bring their birdcages to parks or outskirts to give the birds adequate light and to increase vigour of the birds and promote their growth. And more, sometimes the breeders illuminate the birds in the cages with general or special light rays indoors to help or correct growth of or heal the eyes or feathers of the birds. The techniques and knowledge for bird breeding stated above are various depending on the breeds of the birds being bred. The various techniques can supplement one another.

However, bird breeders all know that sunshine or artificial light rays can both promote growth of birds. Especially for those modern people who are busy all the time long in a day, birds can only get limited light rays in their birdcages in rooms or yards only except in the vacation days when the bird breeders get time to bring the birds outdoors for a walk. Moreover, a special illumination lamp may be mounted beside a birdcage, but the distances, directions and angles of incidence of light rays to the birds in the birdcage just can not be effectively as well as conveniently adjusted. This is the reason why there is still no special lamp for a birdcage in the markets nowadays. The problem is exactly the motive of study of the present invention.

SUMMARY OF THE INVENTION

Design for a special lamp for a birdcage must take consideration of availability of mounting a lamp on any of various network birdcages in the markets. A network birdcage can be in the form of a roof, a dome, a rectangular body etc. The mounting device of the present invention for a lamp for a birdcage meets such requirement. It can be used to mount on any one of the frames for network birdcages, and is designed to arrange the locations for illuminating with the lamp at suitable positions on the top or the four edges of the birdcage. The projection distances and angles of the light rays are adapted to be adjusted after the birdcage is positioned at a suitable location. In this way, the mounting device of the present invention for a lamp on a birdcage is very practical and convenient.

Therefore, the object of the present invention is to provide a mounting device for a birdcage lamp widely useful for various network birdcages. Wherein, the positions of the birdcages or the locations of the light sources and the projection distances and angles of the light rays to the birds in the birdcages are adapted to be adjusted at will. So that the device can be conveniently mounted and adjusted and thereby is practical.

To achieve the above stated object of the present invention, a plurality of locks with hooks therein are used to lock the birdcage lamp on any of various frames for network birdcages in a convenient way (without requirement of a hand tool for mounting). Besides, each lock is pivotally provided on the outer end thereof with a telescopically movable rod, the other end of the rod is pivotally connected to a receptacle of the lamp. By this means, the angular position of the locks relative to the telescopically movable rods can be adjusted at will. And even the range of elongation of the rods can be adjusted at will. So that the function of adjustment of the positions of the birdcages or the locations of the light sources and the projection distances and angles of the light rays to the birds in the birdcages can be effected. Therefore, a specific mounting device for the lamp of a birdcage having the function of adjusting position thereof and random position selecting for locking is completed.

The present invention will be apparent after reading the detailed description of the preferred embodiment thereof in reference to the accompanying drawings.

DETAILED DESCRIPTION OF THE PREFERRED EMBODIMENT

Figure 1:
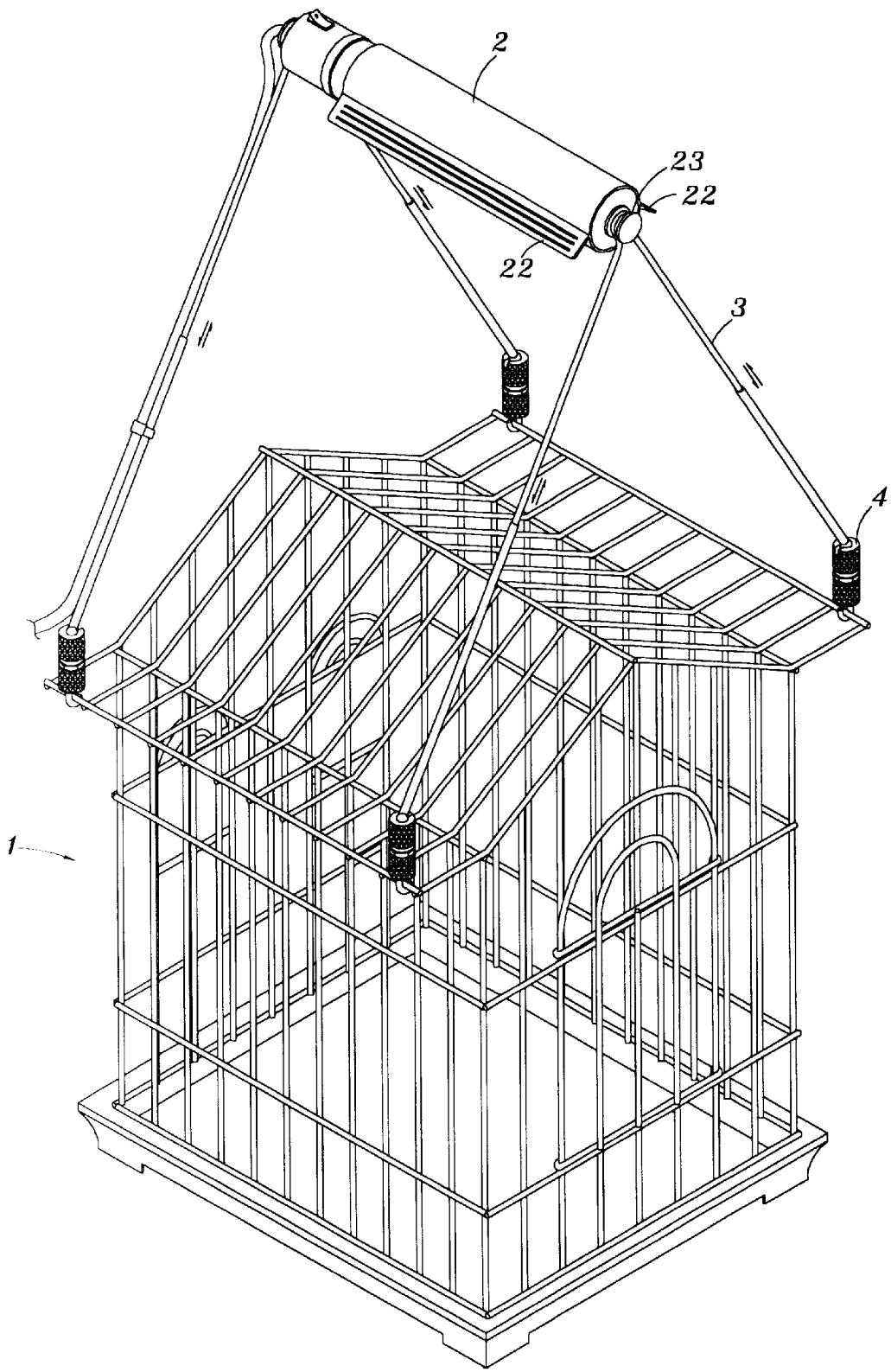
FIG. 1 is a perspective view showing the present invention after mounting.

Referring firstly to FIG. 1, in which a frame 1 of a network birdcage in the form of a roof as can be seen frequently in the markets is depicted. With this embodiment of mounting device for the lamp of a birdcage, the present invention is to be described.

Figure 2:
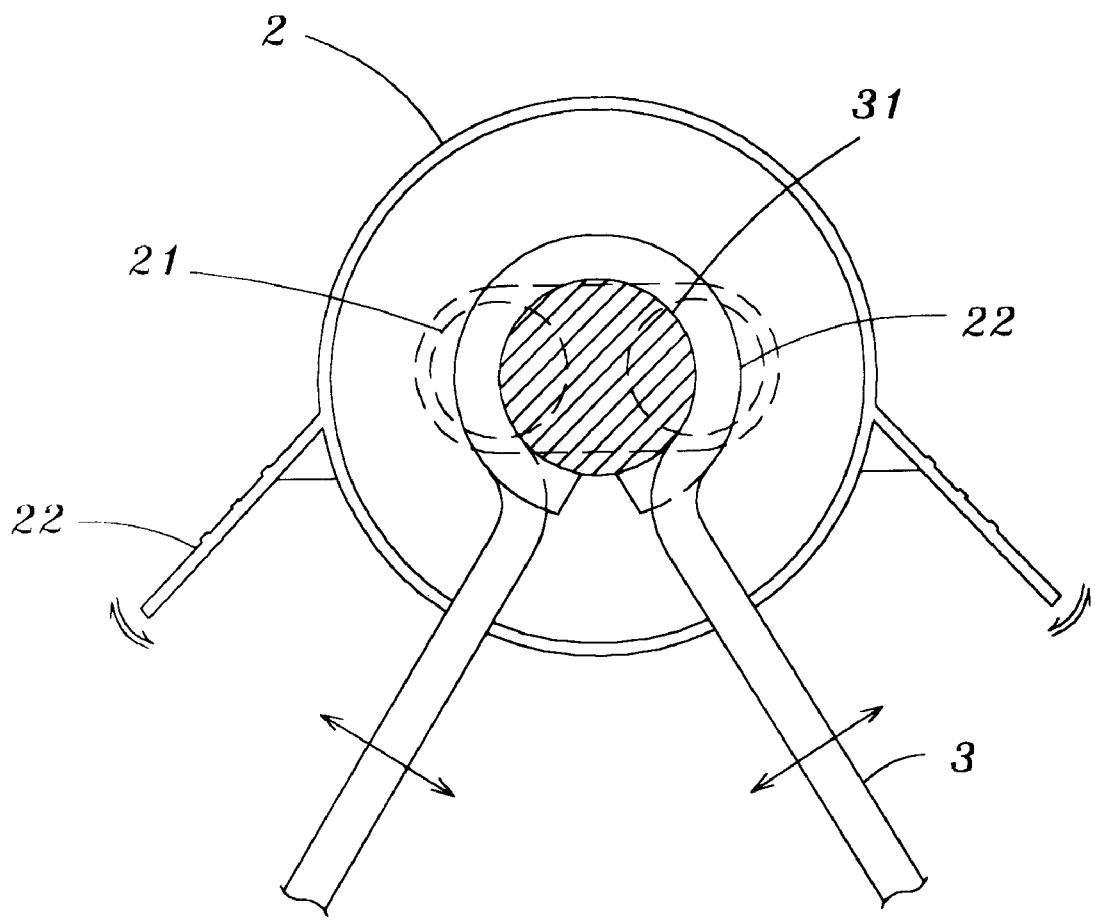
FIG. 2 is a sectional view showing the way of pivotal connecting between the lamp receptacle and a telescopically movable rod of the present invention.

The present invention is comprised of a lamp receptacle 2 provided on both ends thereof at least with a telescopically movable rod 3 having a lock 4 (as shown in FIG. 1). Wherein:

The lamp receptacle 2 is provided therein with a lamp tube 21. The lamp receptacle 2 are preferably provided on its two lateral sides opened for projecting light rays with two side wings 22 to control the angles and range of projection of the rays. The lamp receptacle 2 are provided further on both ends thereof with a circling neck 23 to mount thereon at least a telescopically movable rod 3 (as shown in FIG. 2).

Each telescopically movable rod 3 is formed at the center thereof an approximate circle for pivotal mounting on a circling neck 23 on one end of the lamp receptacle 2. So that the telescopically movable rod 3 is adapted to support the lamp receptacle 2, and pivoting between it and the lamp receptacle 2 is feasible (as shown in FIG. 2). The ends of the telescopically movable rod 3 can be provided with external threads 32 for locking on the lock 4 (as shown in FIG. 3).

Figure 3:
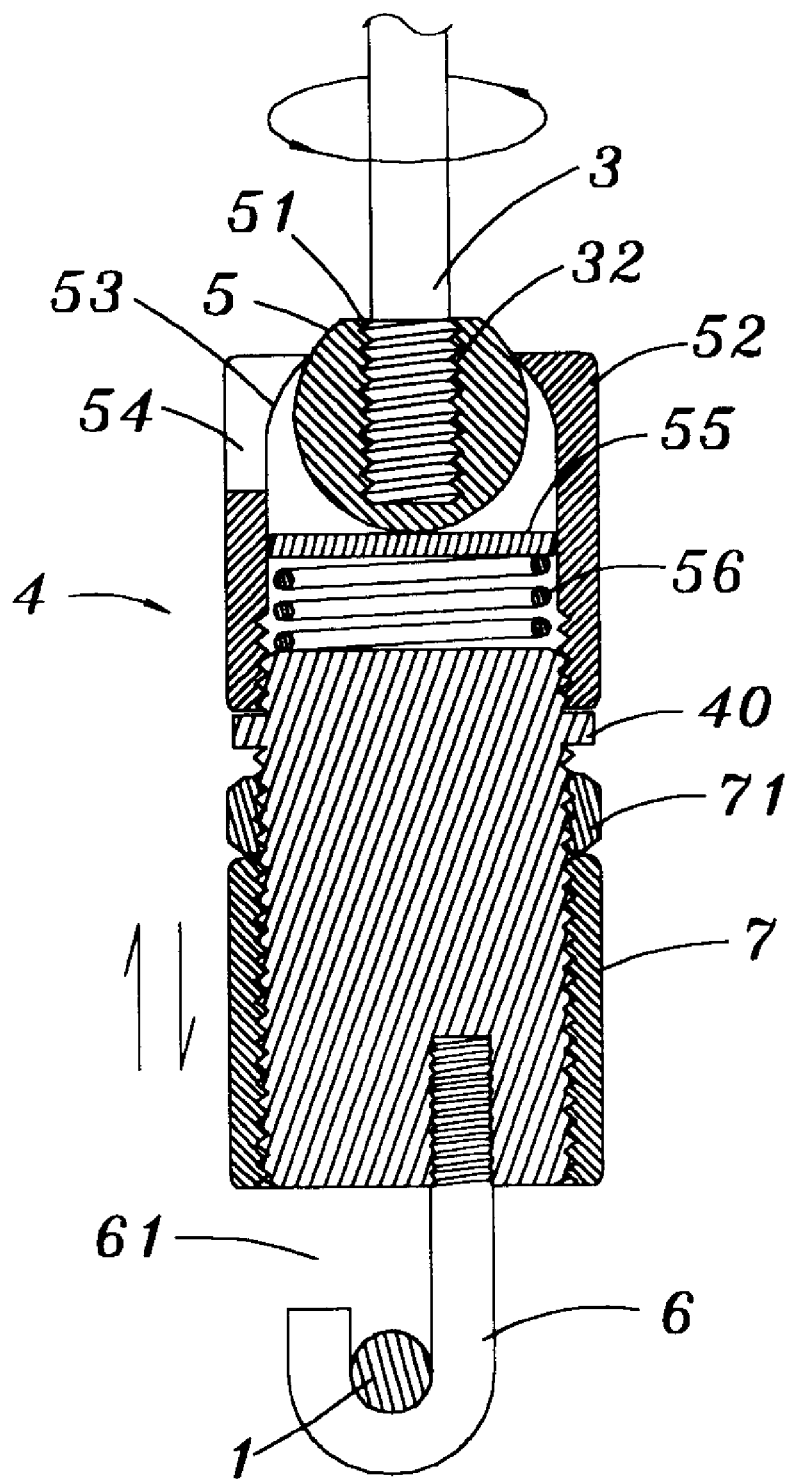
FIG. 3 is a sectional view showing the situation of using of a lock of the present invention.
Figure 4:
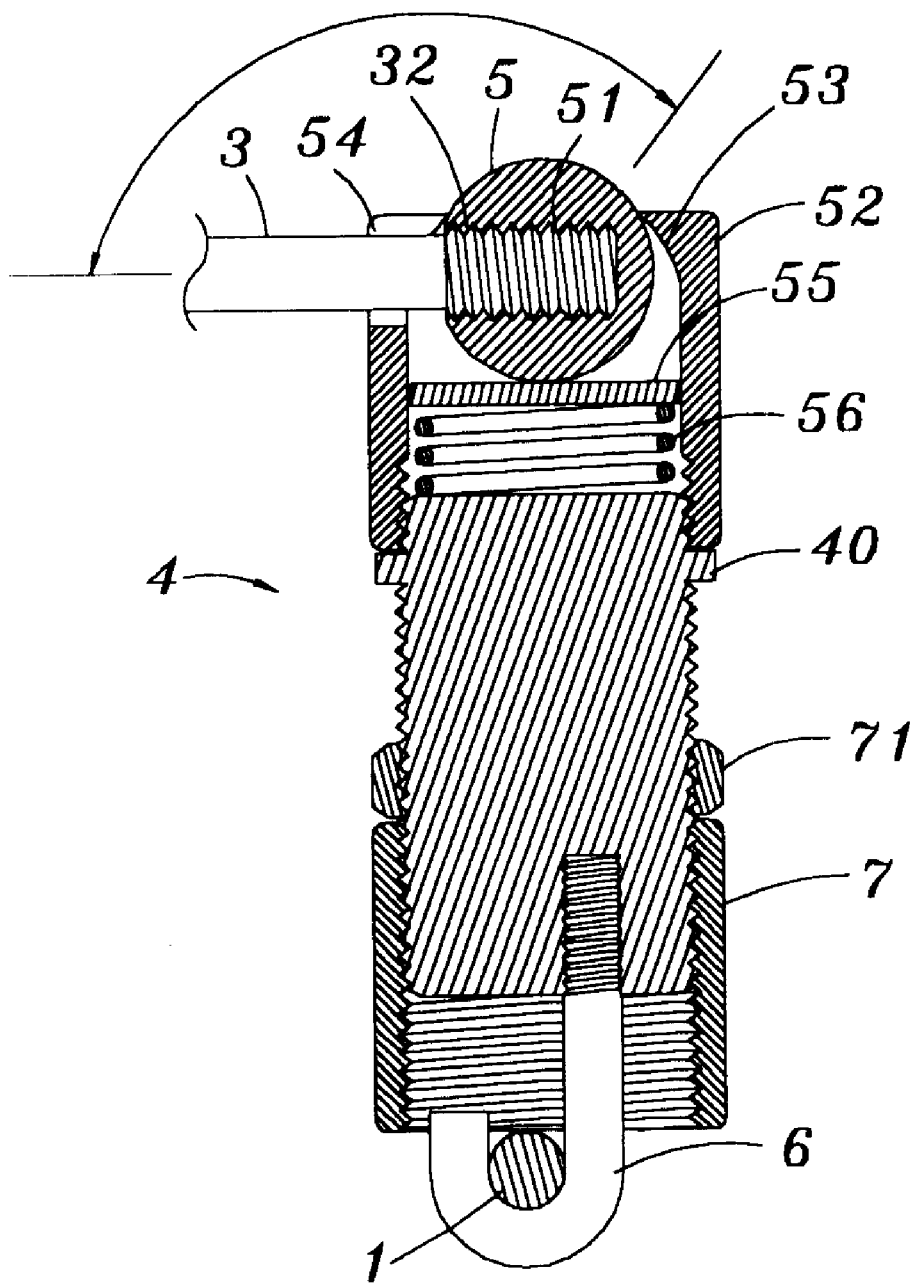
FIG. 4 is another sectional view showing the situation of using of a lock of the present invention.

Each lock 4 is comprised of a base portion 40, at least a pivotally connecting member 5, a hook 6 and a sleeve 7 (as shown in FIG. 3). Wherein:

The pivotally connecting member 5 is made a ball shape in favor of pivotal connecting. The ball shaped pivotally connecting member 5 is provided therein with a thread 51 for locking a telescopically movable rod 3. The pivotally connecting member 5 is movably mounted on one end of the base portion 40, the way of mounting of it relies on the aid of a hood 52 provided on the top of the base portion 40. The hood 52 is formed on the inner wall thereof an arciform wall portion 53 and a notch 54 opened to the outside. The width of the notch 54 is larger than the diameter of the telescopically movable rod 3, so that the telescopically movable rod 3 mounted on the pivotally connecting member 5 can be turned down to be laid flat. I.e., the telescopically movable rod 3 connected on the lock 4 can have more range of angular adjustment (as shown in FIG. 4). The pivotally connecting member 5 is provided on the bottom thereof with a spring seat 55 which is provided further on the bottom thereof with a spring 56, so that the capability of pivoting of the pivotally connecting member 5 can be enhanced by a spring force.

The hook 6 is provided on the other end of the base portion 40. The width of a bending portion 61 of the hook 6 is larger than the diameter of the telescopically movable rod 3 of the frame 1 of the network birdcage, so that the bending portion 61 can hook onto the frame 1 of the network birdcage. Thus the whole network birdcage can be hung appropriately on the frame 1 of the network birdcage by means of a plurality of such hooks 6.

The sleeve 7 is movably slipped over the external wall of the base portion 40 by engagement between the threads provided on both the members. (as shown in FIG. 3 and 4), or by snug elastic clamping of the sleeve 7 on the base portion 40. In engagement between the threads provided on both the sleeve 7 and the external wall of the base portion 40, a part of the sleeve 7 with a thread is screwed onto the outer end of the base portion 40 to cooperate with a nut 71 for locking. In this way, when the birdcage is hung with the hooks 6, by moving outwardly of a plurality of such sleeves 7 through threads, the openings of the bending portions 61 of the hooks 6 are closed (as shown in FIG. 3 and 4). Thereby the locks can be securely locked on the desired positions on the frame 1 of the network birdcage.

Figure 5:
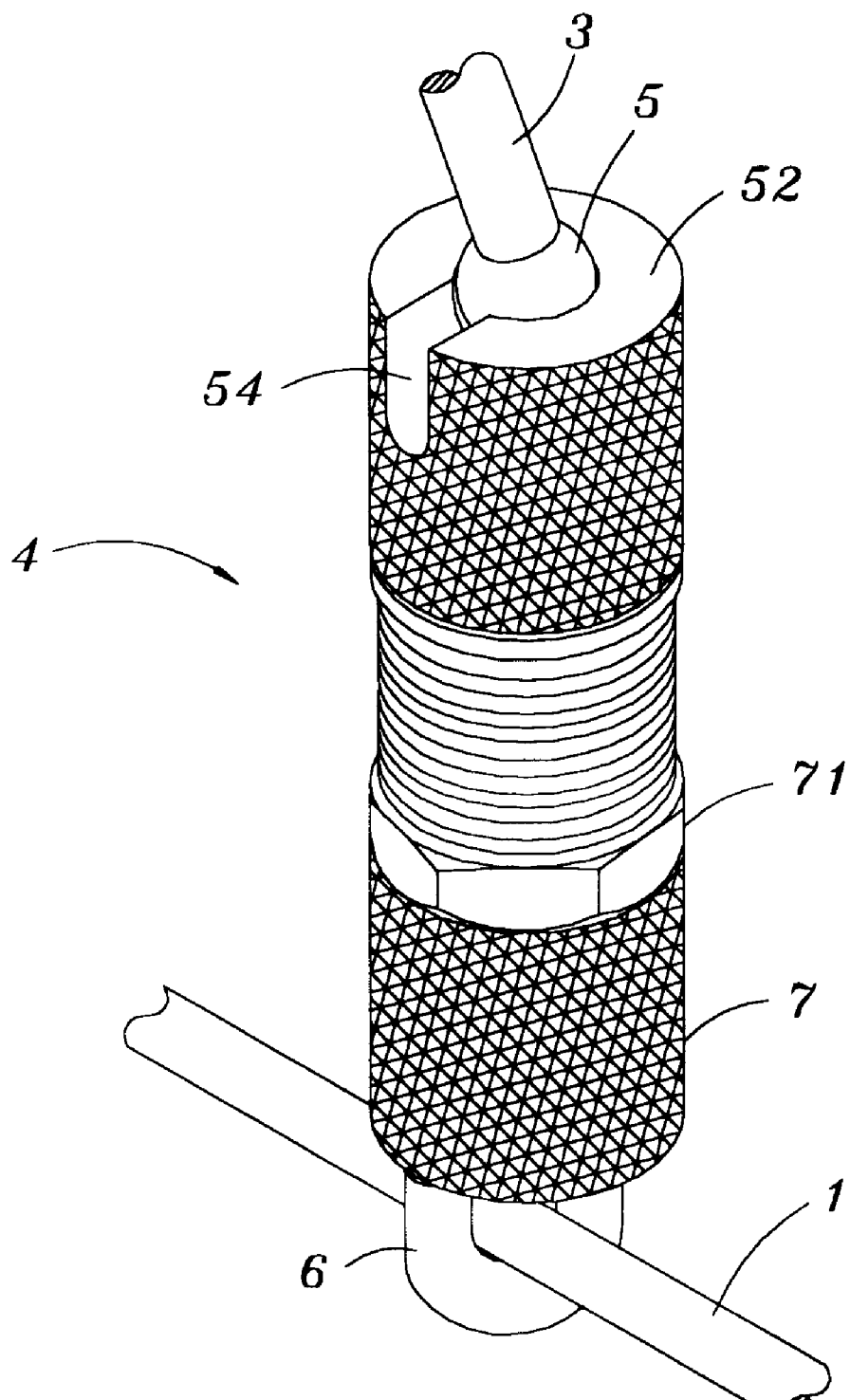
FIG. 5 is a schematic perspective view showing the situation of using of a lock of the present invention.
Figure 6:
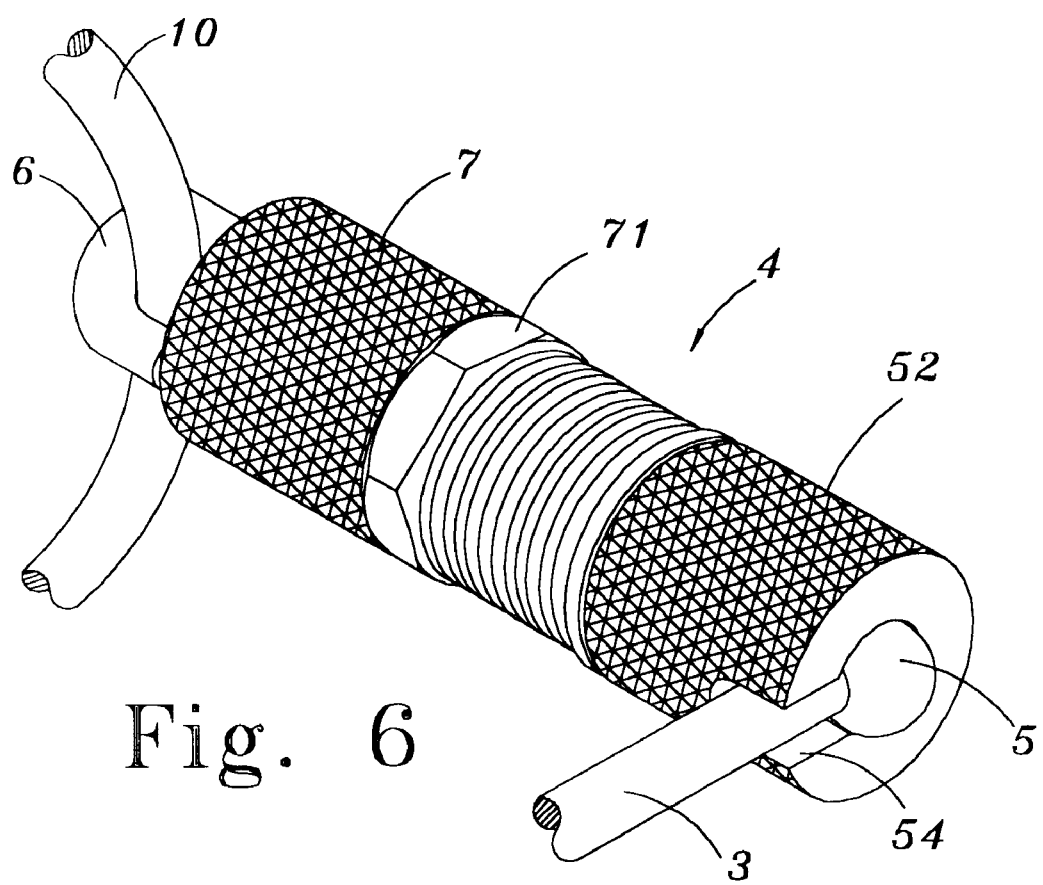
FIG. 6 is another schematic perspective view showing the situation of using of a lock of the present invention.

It can be seen from the above statement that, the hooks 6 on the lock 4 can have options of being locked on the frame 1 of the network birdcage having straight edges (as shown in FIG. 5) or being locked on a frame 10 of a network birdcage having arciform edges (as shown in FIG. 6). The hooks 6 can randomly have their hooking positions and then are secured. Therefore, they suit various network birdcages. Both ends of the telescopically movable rod 3 can be movably and pivotally connected respectively to a lock 4 and the lamp receptacle 2, and the telescopically movable rod 3 itself can be telescopically stretched and contracted. With all these characteristics, the present invention can be widely useful on various network birdcages. And the positions of the lamp receptacles (or the positions of the light sources) and the projection distances and angles of the light rays to the birds in the birdcages can be adjusted at will. Safe and convenient mounting and adjustment can be effected, the present invention thus is practical.

Having thus described my invention, what I claim as new and desire to be secured by Letters Patent of the United States are:

1. A mounting device for a lamp on a birdcage comprising, a lamp receptacle mounting an illumination lamp and provided on both ends thereof at least with a telescopically movable rod, thereby, said mounting device is adapted to be mounted on any frame for various network birdcages, wherein, projection distances and angles of the light rays to birds in said birdcage are adapted to be adjusted in order to promote growth of the birds in said birdcage; said mounting device is characterized by:

said lamp receptacle is supported with both ends thereof on at least one telescopically movable rod which each is pivotally connected with a lock;

said lock includes a base portion, at least a pivotally connecting member, a hook and a sleeve, said pivotally connecting member is used to connect one of said telescopically movable rods capable to freely pivot on said base portion, said hook is mounted on said base portion and is provided with a bending portion, said sleeve is movably or fixedly mounted on the external wall of said base portion and is adapted to control opening and closing of an opening of said bending portion.

2. A mounting device for a lamp on a birdcage as stated in claim 1, wherein, said lamp receptacle and said telescopically movable rod are pivotally connected with each other by means of a circling neck provided on both ends of said lamp receptacle, and by forming at the center of said telescopically movable rod an approximate circle for pivotal mounting on one of said circling necks.

3. A mounting device for a lamp on a birdcage as stated in claim 1, wherein, said pivotally connecting member is made a ball shape in favor of pivotal connecting, and is provided therein with a thread for locking one of said telescopically movable rods.

4. A mounting device for a lamp on a birdcage as stated in claim 1, wherein, the way that said pivotally connecting member is connected with one of said telescopically movable rods for pivoting on said base portion relies on the aid of a hood provided on the top of said base portion, said hood is formed on the inner wall thereof an arciform wall portion and at least a notch opened to the outside, the width of said notch is larger than the diameter of said telescopically movable rod.

5. A mounting device for a lamp on a birdcage as stated in claim 1, wherein, in a position where said base portion connected with said pivotally connecting member, there is a spring seat which is provided further on the bottom thereof with a spring, said pivotally connecting member is supported by the spring force of said spring.

6. A mounting device for a lamp on a birdcage as stated in claim 1, wherein, the width of said bending portion of said hook is larger than the diameter of a corresponding one of said telescopically movable rods on a frame of said birdcage.

7. A mounting device for a lamp on a birdcage as stated in claim 1, wherein, the way that said sleeve is mounted on said base portion is effected by engagement between threads provided on both said sleeve and said base portion.

8. A mounting device for a lamp on a birdcage as stated in claim 7, wherein, said sleeve is movably slipped over the external wall of said base portion by engagement between said threads, in engagement, a part of said sleeve with one of said threads is screwed onto the outer end of said base portion to close the opening of said bending portion of said hook, thereby said birdcage is securely locked with said lock.

* * * * *